US011701940B2

(12) United States Patent
Lalwani

(10) Patent No.: US 11,701,940 B2
(45) Date of Patent: Jul. 18, 2023

(54) METHODS AND APPARATUS FOR ADJUSTING A SUSPENSION OF A VEHICLE

(71) Applicant: Ford Global Technologies, LLC, Dearborn, MI (US)

(72) Inventor: Vishal Lalwani, London (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 470 days.

(21) Appl. No.: 16/806,448

(22) Filed: Mar. 2, 2020

(65) Prior Publication Data

US 2020/0282791 A1    Sep. 10, 2020

(30) Foreign Application Priority Data

Mar. 4, 2019 (GB) ..................................... 1902910

(51) Int. Cl.
*B60G 17/0165* (2006.01)
*B60G 17/018* (2006.01)
(Continued)

(52) U.S. Cl.
CPC ....... *B60G 17/0165* (2013.01); *B60G 17/018* (2013.01); *B60W 40/09* (2013.01);
(Continued)

(58) Field of Classification Search
CPC .............. B60G 17/0165; B60G 17/018; B60G 17/0195; B60G 17/016; B60G 17/0182;
(Continued)

(56) References Cited

U.S. PATENT DOCUMENTS

| 3,559,027 A | 1/1971 | Arsem |
| 6,205,374 B1 | 3/2001 | Kijima et al. |

(Continued)

FOREIGN PATENT DOCUMENTS

| CN | 202608503 | 12/2012 |
| CN | 104044426 | 9/2014 |

(Continued)

OTHER PUBLICATIONS

The Intellectual Property Office, "Combined Search and Examination Report under Sections 17 and 18(3)", issued in connection with application No. GB1902910.7 dated Aug. 21, 2019, 6 pages.

*Primary Examiner* — Maceeh Anwari
(74) *Attorney, Agent, or Firm* — Lorne Forsythe; Hanley, Flight & Zimmerman, LLC

(57) ABSTRACT

Methods and apparatus for adjusting a suspension of a vehicle are described herein. An example apparatus includes a memory storing a plurality of suspension profiles. Each of the suspension profiles includes a stored performance parameter of a vehicle and a suspension setting. The apparatus includes a sensor to detect a driver performance parameter of a driver driving the vehicle. The driver performance parameter represents a behaviour of the driver of the vehicle. The apparatus further includes a processor to compare the driver performance parameter to at least one of the plurality of suspension profiles stored in the memory, and a controller to adjust a suspension of the vehicle according to a first suspension setting of a first suspension profile of the plurality of suspension profiles if the driver performance parameter corresponds to a first stored performance parameter of the first suspension profile.

19 Claims, 8 Drawing Sheets

(51) Int. Cl.
*B60W 40/09* (2012.01)
*B60G 17/0195* (2006.01)
*B60W 10/22* (2006.01)

(52) U.S. Cl.
CPC ...... *B60G 17/0195* (2013.01); *B60G 2600/20* (2013.01); *B60G 2600/21* (2013.01); *B60G 2600/70* (2013.01); *B60W 10/22* (2013.01)

(58) Field of Classification Search
CPC ............ B60G 2600/20; B60G 2600/21; B60G 2600/70; B60G 2400/204; B60G 2400/90; B60G 2401/16; B60G 2500/10; B60G 2500/20; B60W 40/09; B60W 40/10; B60W 10/22; B60W 2556/65; B60W 30/02; B60W 2540/10; B60W 2540/12; B60W 2540/14; B60W 2540/18; B60W 2540/30; B60R 16/037
See application file for complete search history.

(56) References Cited

U.S. PATENT DOCUMENTS

| | | |
|---|---|---|
| 2003/0034697 A1 | 2/2003 | Goldner et al. |
| 2009/0143937 A1 | 6/2009 | Craig |
| 2011/0084503 A1 | 4/2011 | Li et al. |
| 2012/0001399 A1 | 1/2012 | Coombs et al. |
| 2012/0031719 A1 | 2/2012 | Liao et al. |
| 2012/0219721 A1 | 8/2012 | Yasuda et al. |
| 2013/0147205 A1 | 6/2013 | Tucker et al. |
| 2016/0121683 A1 | 5/2016 | Park |
| 2017/0113508 A1 | 4/2017 | Unger |
| 2017/0297564 A1 | 10/2017 | Xi et al. |
| 2017/0369076 A1 | 12/2017 | Goo et al. |
| 2018/0015801 A1 | 1/2018 | Mohamed et al. |
| 2018/0208209 A1 | 7/2018 | Al-Dahle et al. |
| 2019/0206260 A1* | 7/2019 | Pilkington ............ G05D 1/0295 |
| 2019/0389483 A1* | 12/2019 | Likhterman ...... B60W 50/0098 |
| 2020/0269848 A1* | 8/2020 | Kang .................... G06N 20/00 |

FOREIGN PATENT DOCUMENTS

| | | |
|---|---|---|
| CN | 204852156 | 12/2015 |
| CN | 204915185 | 12/2015 |
| CN | 105818633 | 8/2016 |
| CN | 205533960 | 8/2016 |
| CN | 205678045 | 11/2016 |
| CN | 107202088 | 9/2017 |
| CN | 107795633 | 3/2018 |
| DE | 102013001666 | 1/2013 |
| GB | 2520646 | 5/2015 |
| KR | 1020180069204 | 6/2018 |
| WO | 2012010355 | 1/2012 |
| WO | 2018032528 A1 | 2/2018 |

\* cited by examiner

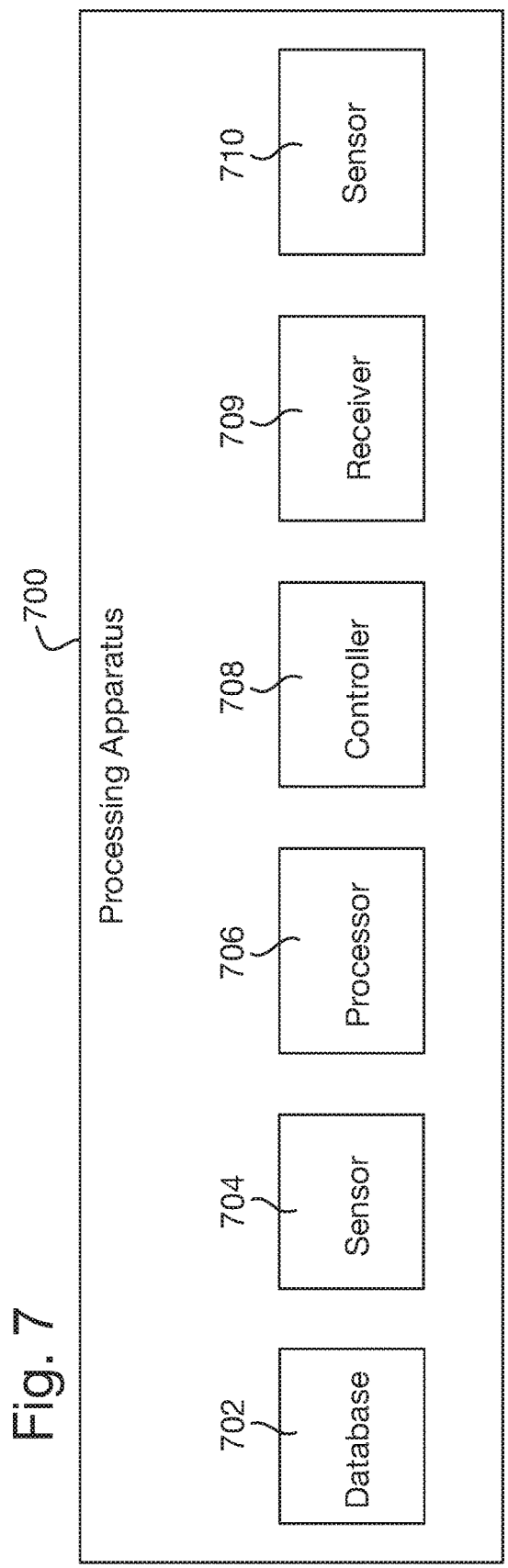

METHODS AND APPARATUS FOR ADJUSTING A SUSPENSION OF A VEHICLE

RELATED APPLICATION

This patent claims priority to United Kingdom (GB) Application No. 1902910.7, titled "A METHOD FOR ADJUSTING THE SUSPENSION OF A VEHICLE," and filed Mar. 4, 2019, which is hereby incorporated by reference in its entirety.

FIELD OF DISCLOSURE

This disclosure relates generally to vehicles and, more particularly, to methods and apparatus for adjusting a suspension of a vehicle.

BACKGROUND

Known technologies that adjust a vehicle's suspension are concerned with/aimed at the road environment immediately ahead of the vehicle. For example, some known systems adjust a vehicle's suspension following the detection of the presence of potholes and other, immediate, road surface defects.

Additionally, some of the known suspension systems are "open-loop" and hence do not have the ability to "learn" from the driver of the vehicle.

SUMMARY

An example apparatus includes a memory storing a plurality of suspension profiles. Each of the suspension profiles includes a stored performance parameter of a vehicle and a suspension setting. The apparatus includes a sensor to detect a driver performance parameter of a driver driving the vehicle. The driver performance parameter represents a behaviour of the driver of the vehicle. The apparatus further includes a processor to compare the driver performance parameter to at least one of the plurality of suspension profiles stored in the memory, and a controller to adjust a suspension of the vehicle according to a first suspension setting of a first suspension profile of the plurality of suspension profiles if the driver performance parameter corresponds to a first stored performance parameter of the first suspension profile.

An example non-transitory machine readable medium includes instructions that, when executed, cause at least one machine to at least detect a driver performance parameter of a driver driving a vehicle. The driver performance parameter represents a behaviour of the driver of the vehicle. The instruction further cause the at least one machine to at least compare the driver performance parameter to at least one suspension profile of a plurality of suspension profiles stored in a database. Each of the suspension profiles includes a stored performance parameter of the vehicle and a suspension setting. The instructions further cause the at least one machine to at least, if the driver performance parameter corresponds to a first stored performance parameter of a first suspension profile of the plurality of suspension profiles, adjust a suspension of the vehicle according to a first suspension setting of the first suspension profile.

An example method includes detecting a driver performance parameter of a driver driving a vehicle. The driver performance parameter representing the behaviour of the driver of the vehicle. The method includes comparing the driver performance parameter to at least one suspension profile of a plurality of suspension profiles stored in a database. Each of the suspension profiles includes a stored performance parameter of the vehicle and a suspension setting. The method further includes, if the driver performance parameter corresponds to a first stored performance parameter of a first suspension profile of the plurality of suspension profiles, adjusting a suspension of the vehicle according to a first suspension setting of the first suspension profile.

BRIEF DESCRIPTION OF THE DRAWINGS

FIG. 6 is an example processing apparatus constructed in accordance with the teachings of this disclosure.

FIG. 7 is an example processing apparatus constructed in accordance with the teachings of this disclosure.

The figures are not to scale. In general, the same reference numbers will be used through the drawing(s) and accompanying written description to refer to the same or like parts.

Figure 1:
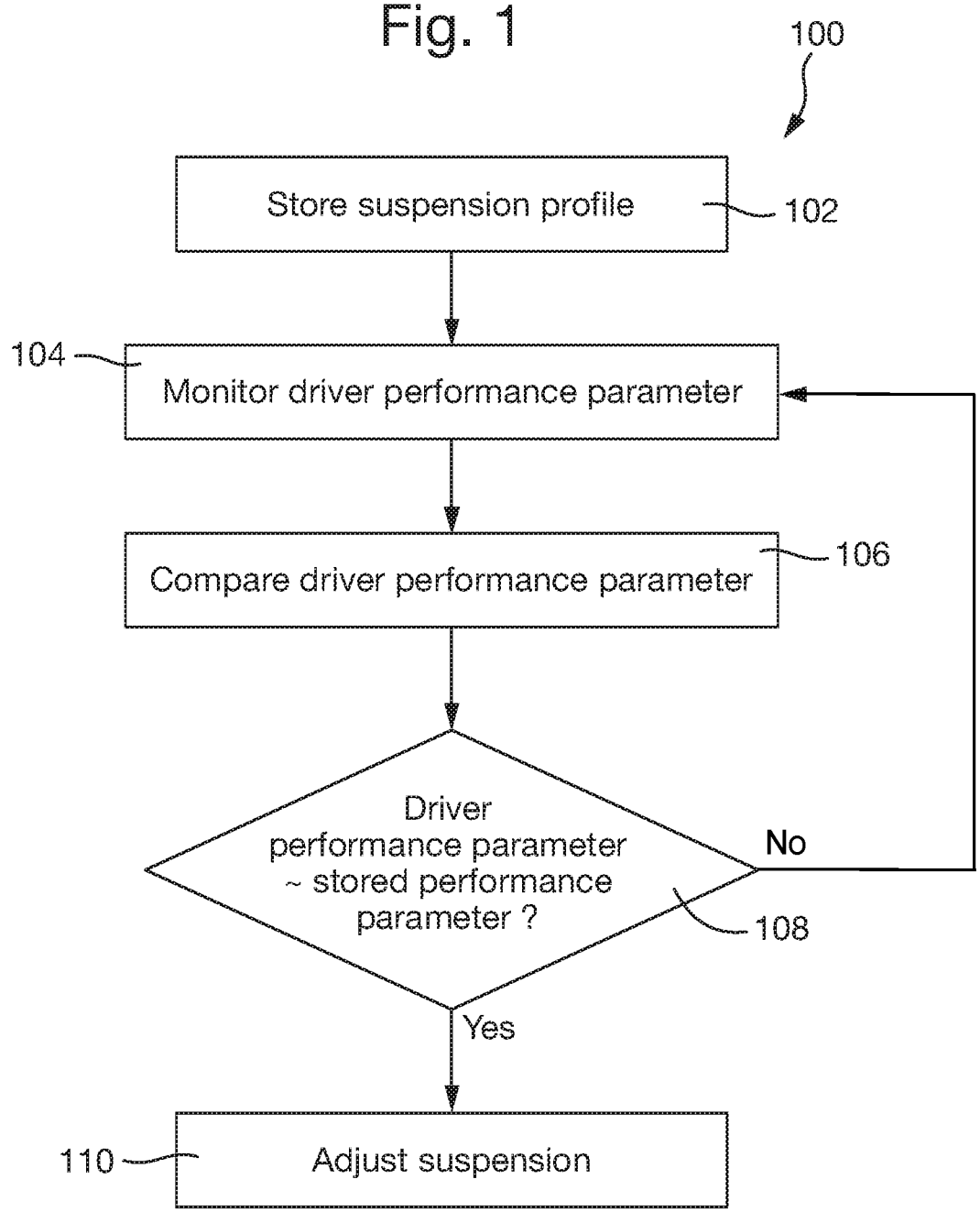
FIG. 1 is a flowchart representative of example machine readable instructions that may be executed to implement an example processing apparatus of FIGS. 6 and/or 7.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some examples disclosed herein relate to adjusting the suspension of a vehicle to suit a certain driver profile. Some examples disclosed herein relate to adjusting the suspension of a vehicle to suit a certain driver profile if matched with a location.

Example methods, apparatus, systems, and articles of manufacture are disclosed herein for monitoring the behaviour of a driver handling/driving a vehicle. For example, a change in driver behaviour may be indicative of that driver wanting to change their suspension/alter their ride softness or harshness. This monitored behaviour is then compared with a number of stored driver profiles, referred to herein as suspension profiles. In some examples, each driver profile has a suspension setting and driver behaviour data that corresponds to the suspension setting (e.g., driver behaviour data being driving in such a way so as to suggest a smooth suspension setting and the suspension setting being a smooth suspension setting). Then, if there is a match between the monitored behaviour and a given suspension profile, the vehicle's suspension is adjusted according to that profile. For example, if there is a match between the monitored behaviour and the stored driver behaviour in a given suspension profile, then the vehicle's suspension is adjusted according to the suspension settings stored in that suspension profile.

In some examples the driver profile is stored in a database, such as a central database hosting a number of driver profiles, or can be communicated to a vehicle from another vehicle in proximity.

In other examples, the driver profile can be set (e.g., manually) by the driver and then loaded into the database for storage.

An example a method disclosed herein includes storing, in a database (e.g., a memory), a set of suspension profiles (e.g., a plurality of suspension profiles). Each of the suspension profiles includes a stored performance parameter of a vehicle and a suspension setting. The example method further includes monitoring (e.g., detecting) a driver performance parameter of a driver driving the vehicle. The driver performance parameter characterises (e.g., represents) the behaviour of the driver of the vehicle. The example method further includes comparing the driver performance parameter to at least one of the suspension profiles stored in the database. If the driver performance parameter corresponds to a stored performance parameter in a first suspension profile in the set of suspension profiles, the example method includes automatically adjusting the suspension of the vehicle according to the suspension setting of the first suspension profile.

In some examples, the monitoring of the driver performance parameter is performed by a sensor. In some examples, the comparing is performed by a controller. In some examples, the controller includes a processor and/or a memory. The controller can automatically adjust the suspension.

As used herein, "corresponds" can mean equal to, substantially equal to, approximately equal to, about, equal to within a tolerance, within a predetermined range of.

In some examples, the suspension of the vehicle is automatically adjusted according to the suspension setting of the first suspension profile if the driver performance parameter is within a target range of the stored performance parameter in the first suspension profile.

In some examples, each suspension profile includes a set of stored performance parameters and a set of suspension settings. The set of stored performance parameters can include a plurality of performance parameters, and the set of suspension settings can include a plurality of suspension settings.

In some examples, monitoring a driver performance parameter includes monitoring a plurality of driver performance parameters and, comparing the driver performance parameter to at least one suspension profile includes comparing each driver performance parameter to each stored performance parameter in the set of stored performance parameters in a first suspension profile. If the number of driver performance parameters that correspond to stored performance parameters in the first suspension profile satisfies a threshold (e.g., is over the threshold, meets or exceeds the threshold, etc.), then the method includes automatically adjusting the suspension of the vehicle according to at least two of the plurality of suspension settings in the set of suspension settings.

In some examples, the suspension of the vehicle can be automatically adjusted if the number of driver performance parameters within a target range of a corresponding stored performance parameter in the first suspension profile satisfies a threshold (e.g., is over the threshold, meets or exceeds the threshold, etc.).

In some examples, the vehicle is a first vehicle, and the method further includes receiving a suspension profile from a second vehicle (e.g., a vehicle within a radius of the first vehicle) or from a central server or database. For example, the first vehicle can receive a suspension profile from a second vehicle, either directly from another vehicle or indirectly via a server or a database (centralised or de-centralised). In some such examples, the method can include storing, in a database in the first vehicle, the received suspension profile.

In some such examples, the method can further include automatically receiving at least one suspension profile from the second vehicle to the first vehicle if the second vehicle is within a predetermined distance from the first vehicle. These examples can utilise car-to-car communication techniques. This enables suspension profiles to be transmitted from one vehicle to another without first passing through a central server. In some examples, the database can be stored in a cloud device.

In some examples, each of the suspension profiles further includes a stored vehicle parameter, and the method can further include monitoring a vehicle parameter of the vehicle, comparing the monitored vehicle parameter to the stored vehicle parameters, and automatically adjusting the suspension profile of the vehicle if the monitored vehicle parameter is within a tolerance of the stored vehicle parameter.

In some examples, each suspension profile further includes a set of stored vehicle parameters. The set of stored vehicle parameters includes a plurality of stored vehicle parameters. The method can further include monitoring a plurality of vehicle parameters of the vehicle, comparing each of the monitored vehicle parameters to each of the stored vehicle parameters in the set, and automatically adjusting the suspension profile of the vehicle if the number of monitored vehicle parameters within a tolerance of the corresponding stored vehicle parameters satisfies a threshold (e.g., is over the threshold, meets or exceeds the threshold, etc.).

An example processing apparatus disclosed herein includes a database (e.g., a memory) configured to store a set of suspension profiles (e.g., a plurality of suspension profiles). Each suspension profile includes a stored performance parameter of a vehicle and a suspension setting. The example processing apparatus further includes a sensor configured to monitor a driver performance parameter of a driver driving the vehicle. The driver performance parameter characterises (e.g., represents) the behaviour of the driver of the vehicle. The processing apparatus further includes a processor configured to compare the driver performance parameter to at least one suspension profile stored in the database, and a controller configured to automatically adjust the suspension of the vehicle according to the suspension setting of a first suspension profile of the set of suspension profiles if the driver performance parameter corresponds to a stored performance parameter in the first suspension profile.

In some examples, the controller is configured to automatically adjust the suspension of the vehicle if the driver performance parameter is within a target range of the stored performance parameter in the first suspension profile. For example, the controller can be configured to access or consult a look-up table (e.g., stored in a memory), and associate the vehicle's suspension with stored suspension settings in the look-up table.

In some examples, each suspension profile includes a set of stored performance parameters and a set of suspension settings. The set of stored performance parameters can include a plurality of performance parameters, and the set of suspension settings can include a plurality of suspension settings.

The sensor can be configured to monitor a plurality of driver performance parameters, the processor can be configured to compare each of the driver performance parameters to each of the stored performance parameter in the set of stored performance parameters in a first suspension profile, and the controller can be configured to automatically adjust the suspension of the vehicle according to at least two of the plurality of suspension settings in the set of suspension settings (e.g., in the first suspension profile) if the number of driver performance parameters corresponding to stored performance parameters in the first suspension profile satisfies a threshold (e.g., is over the threshold, meets or exceeds the threshold, etc.).

In some examples, the controller is configured to automatically adjust the suspension of the vehicle if the number of driver performance parameters within a target range of a corresponding stored performance parameter in the first suspension profile satisfies a threshold (e.g., is over the threshold, meets or exceeds the threshold, etc.).

In some examples, the vehicle is a first vehicle, and the processing apparatus further includes a receiver to receive a suspension profile from a second vehicle or a central database or server. The database (of the processing apparatus) can store the received suspension profile from the second vehicle or server.

In some examples, the processing apparatus further includes a cloud device. The cloud device can include the database.

In some examples, each suspension profile further includes a stored vehicle parameter, and the processing apparatus further includes a second sensor to monitor a vehicle parameter of the vehicle. In some such examples, the processor is to compare the monitored vehicle parameter to the stored vehicle parameter, and the controller is to automatically adjust the suspension profile of the vehicle if the monitored vehicle parameter is within a tolerance of the stored vehicle parameter.

In some examples, each suspension profile includes a set of stored vehicle parameters, where the set of stored vehicle parameters includes a plurality of stored vehicle parameters. In some such examples, the second sensor monitors a plurality of vehicle parameters of the vehicle, the processor compares each monitored vehicle parameter to each stored vehicle parameter in the set, and the controller automatically adjusts the suspension profile of the vehicle if the number of monitored vehicle parameters within a tolerance of corresponding stored vehicle parameters satisfies a threshold (e.g., is over the threshold, meets or exceeds the threshold, etc.).

The second sensor can include a GPS/location sensor, a smart device, and/or a sensor of the vehicle (e.g., a pedestrian sensor, a wiper sensor, a speed sensor, etc.).

An example non-transitory machine readable storage medium is disclosed herein. The non-transitory machine readable storage medium is encoded with instructions executable by a processor. The instructions, when executed by the processor, cause the processor to store, in a database, a set of suspension profiles (e.g., a plurality of suspension profiles), where each of the suspension profiles includes a stored performance parameter of a vehicle and a suspension setting, monitor a driver performance parameter of a driver driving the vehicle, where the driver performance parameter characterises (e.g., represents) the behaviour of the driver of the vehicle, compare the driver performance parameter to at least one suspension profile stored in the database, and, if the driver performance parameter corresponds to a stored performance parameter in a first suspension profile in the set of suspension profiles, automatically adjust the suspension of the vehicle according to the suspension setting of the first suspension profile.

In some examples, the instructions cause the processor to automatically adjust the suspension of the vehicle according to the suspension setting of the first suspension profile if the driver performance parameter is within a target range of the stored performance parameter in the first suspension profile.

In some examples, each suspension profile includes a set of stored performance parameters and a set of suspension settings, and the set of stored performance parameters include a plurality of performance parameters, and the set of suspension settings include a plurality of suspension settings.

In some examples, the instructions cause the processor to monitor a plurality of driver performance parameters, compare each driver performance parameter to each stored performance parameter in the set of stored performance parameters in a first suspension profile, and automatically adjust the suspension of the vehicle according to at least two of the plurality of suspension settings in the set of suspension settings if the number of driver performance parameters corresponding to stored performance parameters in the first suspension profile satisfies a threshold (e.g., is over the threshold, meets or exceeds the threshold, etc.).

In some examples, the instructions cause the processor to automatically adjust the suspension of the vehicle if the number of driver performance parameters within a target range of a corresponding stored performance parameter in the first suspension profile satisfies a threshold (e.g., is over the threshold, meets or exceeds the threshold, etc.).

In some examples, the vehicle is a first vehicle, and the instructions cause the processor to receive, from a second vehicle or a central database or server, a suspension profile, and store, in a database at the first vehicle, the received suspension profile.

In some examples, each suspension profile can further include a stored vehicle parameter, and the instructions cause the processor to monitor a vehicle parameter of the vehicle, compare the monitored vehicle parameter to the stored vehicle parameter, and automatically adjust the suspension profile of the vehicle if the monitored vehicle parameter is within a tolerance of the stored vehicle parameter.

In some examples, each suspension profile includes a set of stored vehicle parameters, where the set of stored vehicle parameters includes a plurality of stored vehicle parameters, and the instructions are to cause the processor to monitor a plurality of vehicle parameters of the vehicle, compare each monitored vehicle parameter to each stored vehicle parameter in the set, and automatically adjust the suspension profile of the vehicle if the number of monitored vehicle parameters within a tolerance of corresponding stored vehicle parameters satisfies a threshold (e.g., is over the threshold, meets or exceeds the threshold, etc.).

In some examples, the vehicle parameter includes at least one of a location of the vehicle, a speed of the vehicle, a number passengers in the vehicle, a weather condition in a vicinity of the vehicle, a vehicle type, or a mood of the driver.

In some examples, the driver performance parameter and/or the stored performance parameters include at least one of a brake pedal pressure of the vehicle, a speed of the vehicle, an engine speed of the vehicle, a steering wheel angle of the vehicle, a rate of change of input (e.g. by a driver) to an accelerator pedal of the vehicle, a rate of change of position of the accelerator pedal of the vehicle, a rate of change of steering wheel angle of the vehicle, or a gear of the vehicle.

Therefore, according to one example, a set of driver behaviours can be monitored (e.g., the force that the driver is imparting to the accelerator, the steering wheel angle, etc.) and these behaviours can be indicative of a driver desiring a harsher ride. If the driver's accelerator input and steering wheel angle match (e.g., correspond to) a stored accelerator input (e.g., a force) and steering wheel angle in a suspension profile that includes a set of suspension settings to give the vehicle a more agile handling, then the vehicle's suspension settings can be automatically adjusted to those suspension settings. This results in the driver experiencing that more agile handling.

Additionally or alternatively, some examples compare a vehicle parameter, such as a GPS location or a number of passengers. For example, driver performance parameters (such as brake pedal pressure and accelerator rate of change of position or input) may be monitored and may be indicative of a driver (a first driver), who would otherwise prefer a harsh ride, wanting a smoother ride. A GPS sensor on that driver's vehicle may indicate that this change in driver preference is due to the vehicle approaching a narrow, windy section of road (or that a passenger has alighted or entered the vehicle). Earlier on that day, a second driver may have adjusted their suspension profile to be on a smoother setting, and may be stored these suspension settings in a new driver profile with the second drivers behaviour (e.g., their brake pedal pressure and accelerator rate of change of input or position). When the vehicle monitors the first driver, if the first driver's performance parameters (in this example, brake pedal pressure and accelerator rate of change of input or position) match or correspond to the second driver's parameter (now stored in the stored second driver suspension profile) and the first driver's GPS location (e.g., vehicle parameter) matches the second driver's GPS location at the time of storing their suspension profile (e.g., the second driver's GPS location), then the first driver's vehicle suspension can be automatically changed according to the stored second driver suspension profile (including the smooth suspension settings). Therefore, in this example, the first driver's vehicle has recognised that the driver is behaving so as to imply they want a change in suspension, and the first driver's behaviour matches that stored in a suspension profile that corresponds to the location of the first driver. The first driver's vehicle therefore changes that suspension to the stored profile of the second driver. In some examples, the suspension profile is stored by the second driver (e.g., stored in a memory of their vehicle) is transmitted from the second driver's vehicle to the first driver's vehicle (e.g., transmitted by the second vehicle, received by the first vehicle and stored in a memory/database thereof, which may then be later accessed when performing the methods described herein). In other examples, the suspension profile is stored in a central server or database and is transmitted to the first vehicle from the central server or database.

FIG. 1 is a flowchart of an example method 100. The flowchart represents machine readable instructions that can be executed by the example processing apparatus of FIGS. 6 and/or 7 and that can be implemented in connection with a vehicle, such as the vehicle disclosed in connection with FIG. 9. The method 100 can be a method of adjusting the suspension of a vehicle, a method of changing the suspension of a vehicle to suit a driver's driving style, and/or a method of monitoring and changing a vehicle's suspension.

At block 102, the method 100 includes storing a set of suspension profiles in a database (e.g., a memory). In some examples, the database is part of a vehicle database and may include, for example, a volatile and/or a non-volatile memory, a volatile and/or a non-volatile memory device. For example, the database can include a compact disc (CD), digital versatile disc (DVD), a read-only memory (ROM), and/or random-access memory (RAM).

Each set of suspension profiles includes a stored performance parameter of a vehicle and a suspension setting. Thereby, each suspension profile can include a stored performance parameter and a corresponding suspension setting. For example, the stored performance parameter can be indicative of a driver behaviour and the suspension setting can correspond to that driver behaviour.

At block 104, the method 100 includes monitoring a driver performance parameter of a driver driving a vehicle. The driver performance parameter in this example characterises the behaviour of the driver of the vehicle.

At block 106, the method 100 includes comparing the driver performance parameter to at least one suspension profile stored in the database. At block 108, the method 100 includes determining whether the driver performance parameter corresponds to a stored performance parameter in a particular suspension profile (e.g., a first suspension profile of the set of suspension profiles). If, at block 108, it is determined that the driver performance parameter does correspond to a stored performance parameter in a first suspension profile, then the method 100 includes, at block 110, adjusting automatically the suspension of the vehicle according to the suspension setting of the first suspension profile.

For example, the driver performance parameter and/or the stored performance parameter can include a brake pedal pressure of the vehicle, the vehicle's speed, an engine speed of the vehicle, a steering wheel angle of the vehicle, a rate of change of the steering wheel angle, an accelerator pedal pressure of the vehicle, a rate of change of the steering wheel angle, and/or a gear of the vehicle.

For example, the stored suspension profile can include an acceleration pedal rate of change of position or input (e.g., in radians/sec or Force/sec), and a corresponding suspension setting (e.g., tune the suspension harder). Therefore, in this example, the stored suspension profile corresponds to a driver accelerating hard and wanting a more exciting ride. The driver performance parameter that is monitored at block 104 in this example can be acceleration pedal rate of change. For example the driver may be varying the force applied to the accelerator pedal. At block 108, the measured parameter is compared to the stored parameter and, if they are equal or substantially or approximately equal, or about equal, or within a tolerance of each other, the suspension is adjusted at block 110 to the stored suspension setting (i.e., in this example, the suspension is tuned to be harder). In this example the method 100 recognises that a monitored driver behaviour matches a stored driver behaviour (with a corresponding suspension setting) and so adjusts the suspension of the vehicle to match the stored corresponding suspension setting. If the monitored driver performance parameter does not match or correspond to any of the stored performance parameters, the example method 100 proceeds back to block 104. Then, an updated monitored driver performance parameter can be detected and compared to the stored performance parameters.

Accordingly, in some examples, the suspension is adjusted when the monitored performance parameter is within a tolerance of the stored performance parameter. In other examples the suspension is adjusted when the monitored performance parameter is about, or substantially or approximately equal to, the stored performance parameter.

Figure 2:
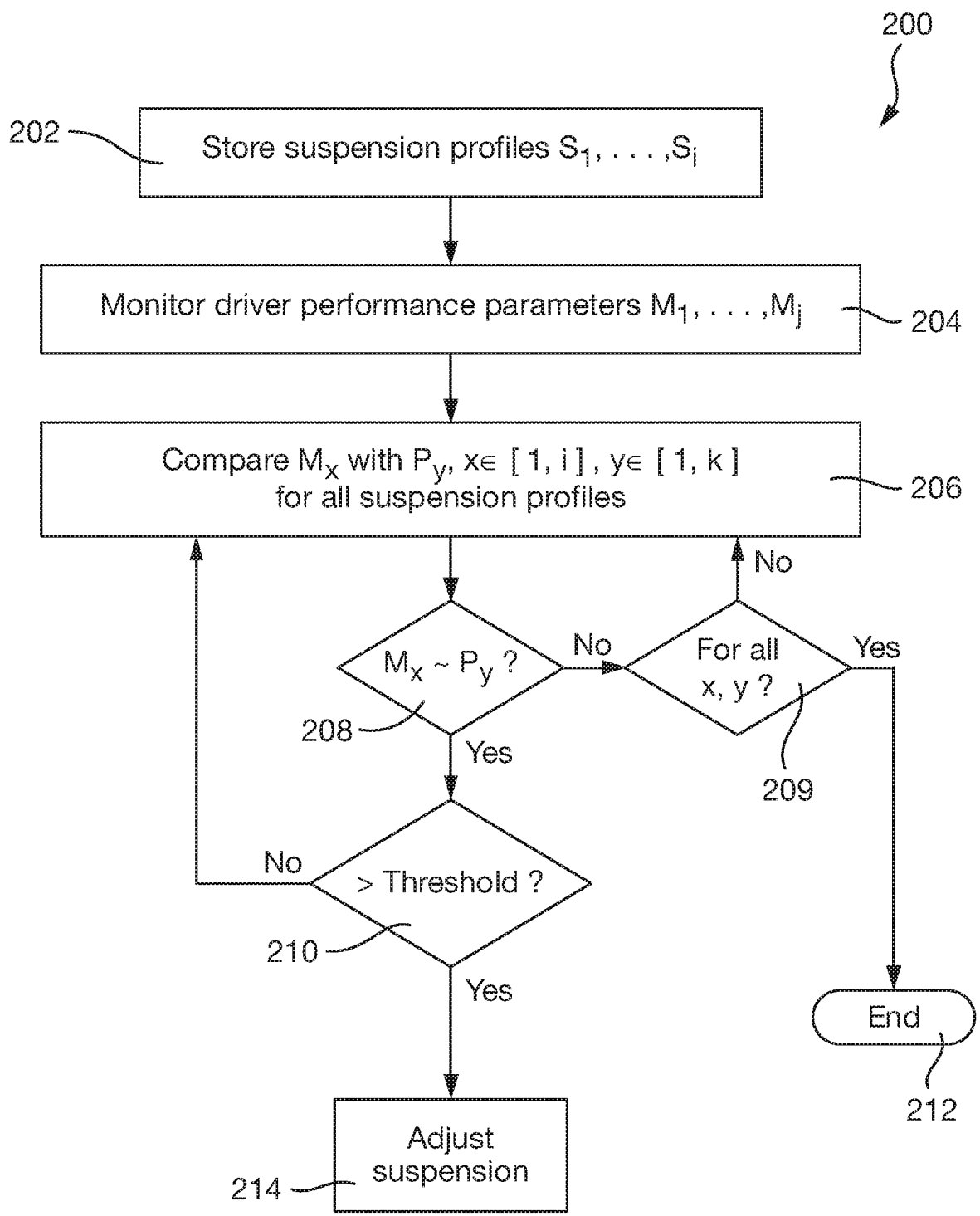
FIG. 2 is a flowchart representative of example machine readable instructions that may be executed to implement an example processing apparatus of FIGS. 6 and/or 7.

FIG. 2 is a flowchart of an example method 200. The flowchart represents machine readable instructions that can be executed by the example processing apparatus of FIGS. 6 and/or 7 and that can be implemented in connection with a vehicle, such as the vehicle disclosed in connection with FIG. 9. The method 200 can be a method of adjusting the suspension of a vehicle, a method of changing the suspension of a vehicle to suit a driver's driving style, and/or a method of monitoring and changing a vehicle's suspension.

At block 202, the method 200 includes storing a set of suspension profiles S1, . . . , Si in a database (e.g., a memory). Each set of suspension profiles includes a set of stored performance parameters P1, . . . , Pk of a vehicle and a set of suspension settings (e.g. SS1, . . . , SSn). Therefore, each suspension profile includes a plurality of stored performance parameters and a corresponding plurality of suspension settings. For example, the stored performance parameters can be indicative of a driver behaviour and the suspension settings can correspond to that driver behaviour. In other examples, as in the example of FIG. 1, each of the suspension profiles may only include one parameter and one setting.

At block 204, the method 200 includes monitoring driver performance parameters M1, . . . , Mj of a driver driving a vehicle. The driver performance parameters characterise the behaviour of the driver of the vehicle.

At block 206, the method 200 includes comparing one or more of the driver performance parameters to at least one suspension profile stored in the database. For example, if there are j monitored performance parameters and k stored performance parameters, block 206 may include comparing Mx with Py, where x=1, . . . , j and y=1, . . . , k. Such a comparison may be performed for all values of x, y (e.g., compare each monitored performance parameter to each stored performance parameter).

At block 208, the method 200 includes, following the comparison at block 206, determining whether the driver performance parameter corresponds to a stored performance parameter in a particular suspension profile (e.g., a first suspension profile). For example, block 208 includes determining whether, for a given value of x and y, if Mx corresponds to Py. If, at block 208, it is determined that the driver performance parameter does correspond to a stored performance parameter in a first suspension profile (e.g., for the given x,y Mx corresponds to Py), then, at block 210, the method 200 includes assessing whether the number of monitored driver performance parameters that do correspond to a stored performance parameter are over a predetermined threshold (e.g., whether the number of monitored driver performance parameters that correspond to a stored performance parameter in a given suspension profile are over a predetermined threshold.). If yes (e.g., if the number is over the threshold), then the method 200 includes, at block 214, adjusting the suspension setting of the vehicle according to one, or at least two, of the plurality of suspension settings SS1, . . . , SSn in the suspension profile that matched with the monitored performance parameters. For example the threshold may be 3, in which case 3 monitored performance parameters of the driver driving the vehicle must correspond to stored performance parameters in a particular suspension profile before the suspension is adjusted according to that profile.

On the other hand, if, at block 208, the monitored performance parameter Mx does not correspond to a stored performance parameter Py, then, at block 209, it is checked whether the monitored performance parameter Mx has been compared to all stored performance parameters (e.g., for all values of y), and if all monitored performance parameters Mx have been compared to a stored performance parameter (e.g., for all values of x). If not, then the method 200 returns to repeat blocks 206 and 208 until all monitored performance parameters have been compared with all stored performance parameters in each suspension profile. Therefore, blocks 206-210 are performed for each suspension profile in the set. In other words, every monitored performance parameter is compared with every stored performance parameter in each stored suspension profile, and when over a threshold number of monitored performance parameters correspond to stored parameters in any given (e.g., a first) suspension profile then (at block 214) is the suspension of the vehicle adjusted according to that (e.g., the first) suspension profile.

At block 210, if the number of monitored performance parameters that correspond to stored performance parameters is less than the threshold, then the method 200 returns to block 206 to compare another monitored performance parameter with another stored performance parameter. As indicated by the looping arrow, this the comparison at block 206 and the check at block 208 are performed in this example for all monitored performance parameters and all stored performance parameters in all suspension profiles to determine if the driver of the vehicle is driving according to one particular suspension profile and, if they are, adjusting the suspension settings according to that profile.

If, at block 209, there are no matches (e.g., no corresponding parameters), then the method 200 proceeds to block 212 where the method 200 ends.

In some examples, block 210 includes determining whether a threshold number of monitored performance parameters correspond to stored performance parameters. In another example, block 208 includes determining whether a given monitored performance parameter is within a target range of one or more stored performance parameters. In other examples, block 210 can include determining whether a threshold number of monitored performance parameters are within a target range of one or more stored performance parameters.

For example, if a second user (which may be a driver of a second vehicle) has adjusted their suspension settings to suit a certain driving style, the suspension of a (first) vehicle being driven by a first driver may be automatically adjusted to these second user suspension settings if the first driver is adopting a similar driving style to the second user.

For example, assume the second user is driving according to performance parameters P1 and P2 (e.g., P1 is a steering wheel angle value and P2 is an accelerator pedal rate of change) and adjusts their suspension settings according to a particular setting SS1. This profile (e.g., P1, P2 and SS1) is stored in the database as a suspension profile. Then, if a first driver is driving their vehicle such that their steering wheel angle and accelerator pedal rate of change value are each within a tolerance of P1 and P2 respectively, then according to the example methods 100 and 200 the first driver's vehicle suspension can be automatically adjusted to match the setting SS1.

Figure 3:
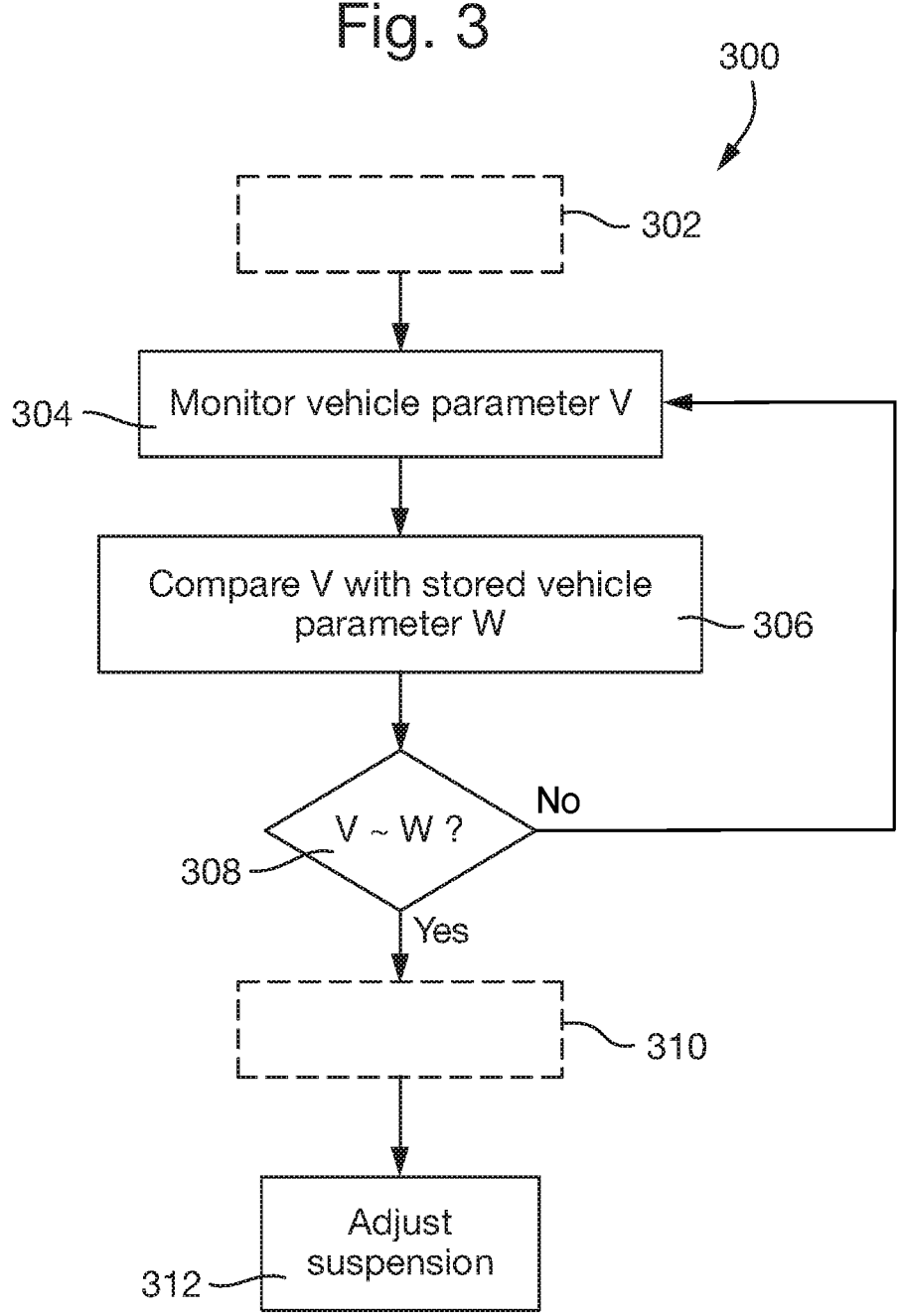
FIG. 3 is a flowchart representative of example machine readable instructions that may be executed to implement an example processing apparatus of FIGS. 6 and/or 7 and that may be implemented in conjunction with the flowcharts of FIGS. 1 and/or 2.

FIG. 3 is a flowchart of an example method 300. The flowchart represents machine readable instructions that can be executed by the example processing apparatus of FIGS. 6 and/or 7 and that can be implemented in connection with a vehicle, such as the vehicle disclosed in connection with FIG. 9. The method 300 can be performed in conjunction with either one of the methods 100 or 200 as shown in the examples of FIGS. 1 and 2, respectively. For example, blocks 102-108 of the method 100 or blocks 202-210 of the method 200 can be performed in block 302 of method 300, prior to block 304-312 of method 300. In other examples, blocks 102-108 of method 100 or blocks 202-210 of method 200 can be performed in block 310 of method 300, after blocks 304-308 of method 300. This is illustrated by blocks 302 and 310 being in phantom lines in FIG. 3.

Method 300 includes, at block 304, monitoring a vehicle parameter of the vehicle. The method 300 includes, at block 306, comparing the monitored vehicle parameter to a stored vehicle parameter. The stored vehicle parameter can be stored as part of a suspension profile (e.g., a suspension profile that includes the vehicle parameter). At block 308, the method 300 includes determining whether the monitored vehicle parameter matches, or corresponds to, (e.g., is about equal, substantially equal, approximately equal, or within a target range or tolerance of) the stored vehicle parameter. If the monitored vehicle parameter matches or corresponds to the stored vehicle parameter, then, at block 312, the suspension is adjusted according to the suspension settings of the suspension profile that included the stored vehicle parameter.

In some examples, block 304 includes monitoring a plurality of vehicle parameters and each suspension profile includes a plurality of vehicle parameters. In such an example, block 306 includes comparing each of a plurality of monitored vehicle parameters to a stored vehicle parameter, and block 308 includes automatically adjusting the suspension if over a threshold level of monitored vehicle parameters match/correspond to stored vehicle parameters.

The vehicle parameters (e.g., the monitored and/or stored vehicle parameters) can include a location of the vehicle being driven by the driver, a speed of the vehicle, a number of passengers in the vehicle, a weather condition at the vehicle's location, a vehicle type, and/or a mood of the driver.

For example, if the second driver approaches a location (location L) and, accordingly, adjusts their driving behaviour so that they are driving according to performance parameters P1 and P2 (e.g., P1 is a brake pedal pressure and P2 is an engine speed; location L is a section of unpaved road requiring more careful driving) and the second driver adjusts their suspension settings according to a particular set of settings SS1 and SS2, this profile (e.g. P1, P2, SS1 and SS2) can be stored in the database (e.g., a memory in the second vehicle) as a suspension profile corresponding to location L. Then, assume a first driver is driving their vehicle within the vicinity of location L, and their brake pedal pressure and engine speed and are each within a tolerance of P1 and P2 respectively. Then, according to the example methods 100 and 200, in conjunction with the method 300 where the vehicle parameter (location in this example is matched), the first driver's vehicle suspension is automatically adjusted to match the settings SS1 and SS2. In another example, the suspension profile (e.g., P1, P2, SS1, and SS2) can be stored with a specified number of passengers (e.g., 4 passengers). This may represent the driver driving more smoothly (and consequentially a smoother suspension setting) due to the larger number of passengers. Then, if a first driver picks up three other passengers so that there are 4 people in the first vehicle, and drives according to the parameters P1 and P2, then the first driver's vehicle suspension can be automatically adjusted to match SS1 and SS2. If the monitored vehicle parameter does not match or correspond to any of the stored vehicle parameters, the example method 300 proceeds back to block 304. Then, an updated monitored vehicle parameter can be detected and compared to the stored vehicle parameters.

Figure 4:
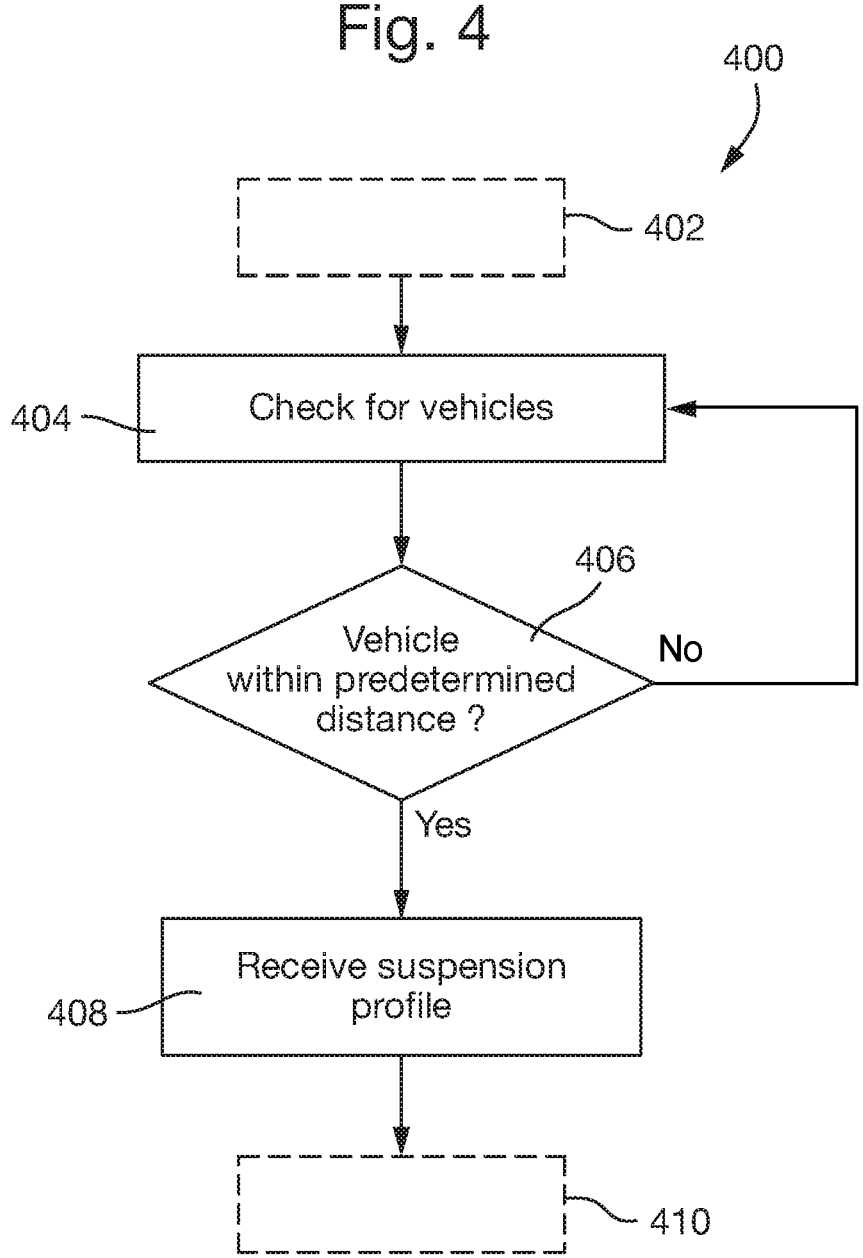
FIG. 4 is a flowchart representative of example machine readable instructions that may be executed to implement an example processing apparatus of FIGS. 6 and/or 7 and that may be implemented in conjunction with the flowcharts of FIGS. 1, 2, and/or 3.

FIG. 4 is a flowchart of an example method 400. The flowchart represents machine readable instructions that can be executed by the example processing apparatus of FIGS. 6 and/or 7 and that can be implemented in connection with a vehicle, such as the vehicle disclosed in connection with FIG. 9. The method 400 can be performed in conjunction with either one of the methods 100 or 200 as shown in the examples of FIGS. 1 and 2, respectively. The example method 300 can also be performed in conjunction with the method 300 of the example of FIG. 3. In other words, the method 400 can be performed in conjunction with the method 300 of FIG. 3 (optionally including the method 100 and/or the method 200 in blocks 302 and/or 310).

For example, the blocks of method 300 can be performed in block 410. For example, blocks 102-108 of method 100 or blocks 202-210 of method 200 can be performed in block 402 of method 400, prior to block 404-408 of method 400. In other examples, blocks 102 of method 100 or blocks 202-210 of method 200 can be performed in block 410 of method 400, after blocks 404-408 of method 400. This is illustrated by blocks 402 and 410 being in phantom lines in FIG. 4.

The method 400 includes, at block 404, checking for vehicles (hereafter "other vehicles") in the vicinity of the vehicle being driven by the driver (hereafter "the vehicle"). The method 400 includes, at block 406, determining whether there are any other vehicles within a predetermined distance of the vehicle. In some examples, a sensor is provided on the vehicle to detect if other vehicles are within the predetermined distance. If there are other vehicles within a predetermined distance of the vehicle, the method 400 includes, at block 408, receiving a suspension profile from one of the other vehicles. If a vehicle is not within the predetermined distance, the example method 400 proceeds back to block 404, and the example method 400 repeats.

As such, when used in conjunction with the method 400 of FIG. 4, either one of the methods 100 or 200 may further include receiving a suspension profile from a second vehicle and storing that profile in the database (e.g., the received profile includes a stored performance parameter and a suspension setting) and the methods 100 and 200 may further include comparing monitored performance parameters to the suspension profile received from the second vehicle.

Figure 5:
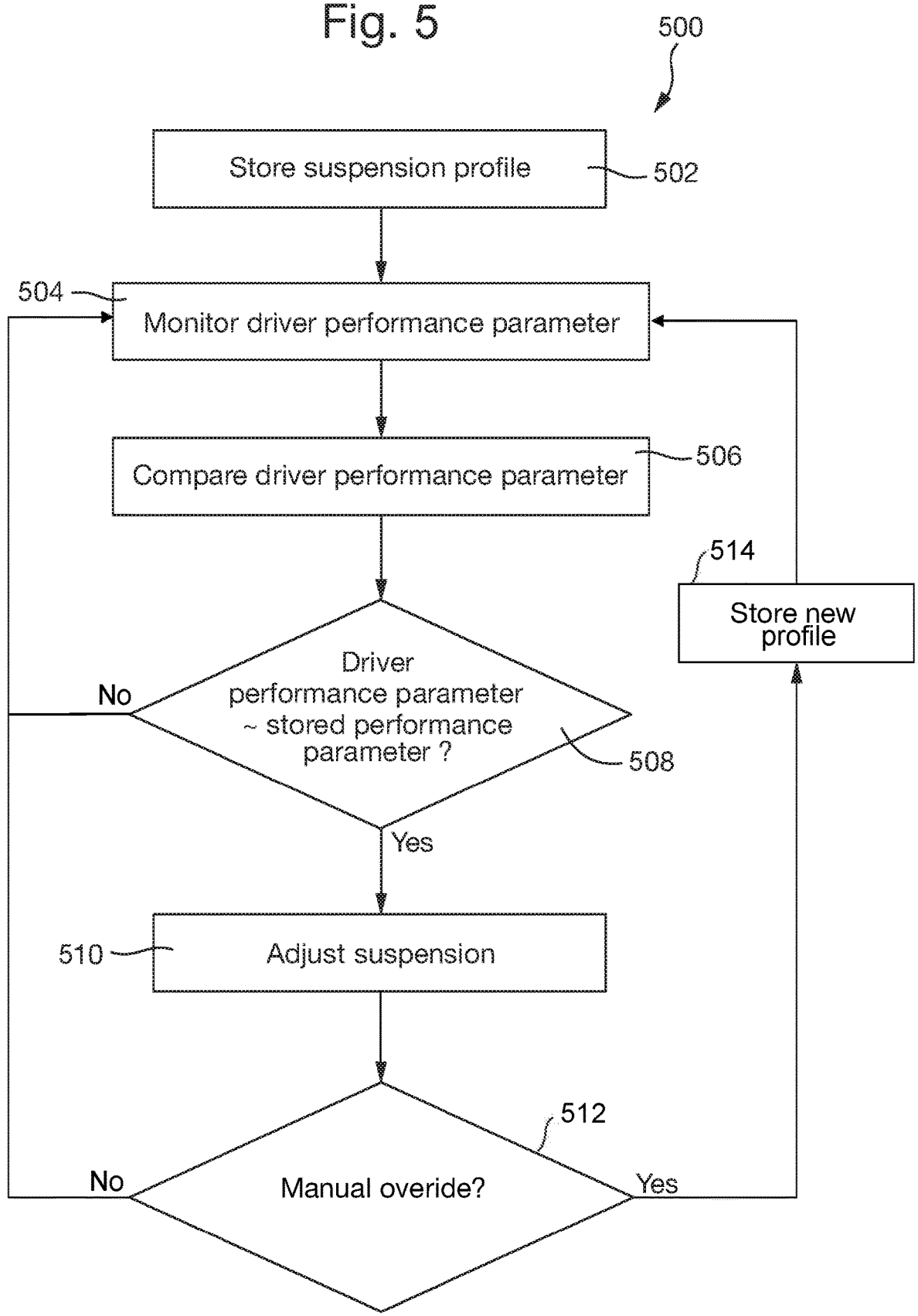
FIG. 5 is a flowchart representative of example machine readable instructions that may be executed to implement an example processing apparatus of FIGS. 6 and/or 7 and that may be implemented in conjunction with the flowcharts of FIGS. 1, 2, 3, and/or 4.

FIG. 5 is a flowchart of an example method 500. The flowchart represents machine readable instructions that can be executed by the example processing apparatus of FIGS. 6 and/or 7 and that can be implemented in connection with a vehicle, such as the vehicle disclosed in connection with FIG. 9. Blocks 502-510 are the same as blocks 102-110 as described above with reference to the method 100 of FIG. 1. After block 510 at which the suspension is adjusted to the stored profile, the method 500 proceeds to blocks 512-516, which represents an opportunity for the driver to override what the vehicle has automatically done. At block 512, the method 500 includes determining whether the driver is satisfied with the suspension profile (the stored profile) that the vehicle was adjusted to at block 510, following the matching of the driver's performance to the stored profile. At block 512, the driver has the opportunity to override the new suspension of the vehicle. Therefore, if it is determined at block 512 that the driver is satisfied (which may be represented by no intervention of the driver) then the method 500 continues to monitor, at block 504, the driver's performance (e.g., the suspension of the vehicle is not changed further if the driver does not intervene (although may at blocks 506-510 be changed if the driver changes their behaviour)). On the other hand, if at block 512 the driver overrides the suspension, which can include changing one of the suspension settings, then the method 500 proceeds to block 514 at which the new suspension setting is stored as a new suspension profile. In another example, block 514 can include modifying the suspension profile to take in to account the new settings of the user (e.g., changing the overridden profile to include one of the new settings). The method 500 then proceeds to block 504 at which the driver's performance is monitored. Therefore the system (e.g., the processing apparatus) continually monitors the driver performance in an adaptive mode (e.g., is able to change the suspension to take into account changes from the driver). In the example method 500 the vehicle can automatically change the suspension to a new profile (Profile 1) based on the drive performance. However, if the driver manually overrides at least one suspension setting of Profile 1, then either Profile 1 can be modified to include the changed suspension setting, or this profile can be stored as a new profile, Profile 2. The newly stored Profile 2 can be stored in a database (locally or remotely), and can be communicated to another vehicle for later use.

FIG. 6 is a block diagram of an example processing apparatus 600. The processing apparatus may be partially or wholly implemented in a vehicle, such as the vehicle disclosed in connection with FIG. 9. The processing apparatus 600 can perform any of the methods 100-500 of the examples of FIGS. 1-5, respectively.

In the illustrated example, the processing apparatus 600 includes a database 602, a sensor 604, a processor 606, and a controller 608. The database 602 is configured to store a set of suspension profiles. Each suspension profile includes one or more stored performance parameters of a vehicle and one or more suspension settings. The sensor 604 is configured to monitor a driver performance parameter of a driver driving a vehicle. The driver performance parameter characterises the behaviour of the driver of the vehicle. The processor 606 is configured to compare the driver performance parameter to at least one suspension profile stored in the database. The controller 608 is configured to automatically adjust the suspension of the vehicle according to the suspension setting of a first suspension profile of the set of suspension profiles if the driver performance parameter corresponds to a stored performance parameter in the first suspension profile.

In some examples, the controller 608 is configured to automatically adjust the suspension of the vehicle if the driver performance parameter is within a target range of the stored performance parameter in the first suspension profile. In some examples, the sensor 604 is configured to monitor a plurality of driver performance parameters and the processor 606 is configured compare each driver performance parameter to each stored performance parameter in the set of stored performance parameters in a first suspension profile. In some such examples, the controller 608 is configured to automatically adjust the suspension of the vehicle according to at least two of the plurality of suspension settings in the set of suspension settings if over a threshold number of driver performance parameters correspond to stored performance parameters in the first suspension profile.

In some examples, the controller 608 is configured to automatically adjust the suspension of the vehicle if over a threshold number of driver performance parameters are within a target range of a corresponding stored performance parameter in the first suspension profile. While in FIG. 6 the processor 606 and the controller 608 are shown as separate, it is understood the controller 608 could be implemented by the processor 606.

FIG. 7 shows an example processing apparatus 700. The processing apparatus may be partially or wholly implemented in a vehicle, such as the vehicle disclosed in connection with FIG. 9. In the illustrated example, the processing apparatus 700 includes a database 702, a sensor 704, a processor 706, and a controller 708, which are the same as the database 602, the sensor 604, the processor 606, and the controller 608, respectively, of the example apparatus 600 of FIG. 6. The processing apparatus 700 of FIG. 7 further includes a receiver 709 and another sensor 710 (e.g., a second sensor). The receiver 709 is to receive a suspension profile from another vehicle, either directly from another vehicle or via a server or database (either centralised or de-centralised). The database 702 is to store the received suspension profile. The sensor 710 is to monitor a vehicle parameter of the vehicle. In this example, the processor 706 is to compare the monitored vehicle parameter to the stored vehicle parameter, and the controller 708 is to automatically adjust the suspension profile of the vehicle if the monitored vehicle parameter is within a tolerance of the stored vehicle parameter.

In some examples, the sensor 710 is to monitor a plurality of vehicle parameters of the vehicle, the processor 708 is to compare each monitored vehicle parameter to each stored vehicle parameter in the set, and the controller 708 is to automatically adjust the suspension profile of the vehicle if over a threshold number of monitored vehicle parameters are within a tolerance of corresponding stored vehicle parameters.

While example manners of implementing the processing apparatus 600 of FIG. 6 and the processing apparatus 700 of FIG. 7 are illustrated in FIGS. 6 and 7, one or more of the elements, processes and/or devices illustrated in FIGS. 6 and 7 may be combined, divided, re-arranged, omitted, eliminated and/or implemented in any other way. Further, the example database 602, 702, the example processor 606, 706, the example controller 608, 708, and/or, more generally, the example processing apparatus 600 and/or the example processing apparatus 700 of FIGS. 6 and 7 may be implemented by hardware, software, firmware and/or any combination of hardware, software and/or firmware. Thus, for example, any of the example database 602, 702, the example processor 606, 706, the example controller 608, 708 and/or, more generally, the example the example processing apparatus 600 and/or the example processing apparatus 700 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 602, 702, the example processor 606, 706, and/or the example controller 608, 708 is/are hereby expressly defined to include a non-transitory computer readable storage device or storage disk such as a memory, a digital versatile disk (DVD), a compact disk (CD), a Blu-ray disk, etc. including the software and/or firmware. Further still, the example processing apparatus 600 and/or the example processing apparatus 700 of FIGS. 6 and 7 may include one or more elements, processes and/or devices in addition to, or instead of, those illustrated in FIGS. 6 and 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the processing apparatus 600 and/or the processing apparatus 700 are shown in FIGS. 1-5. The machine readable instructions may be one or more executable programs or portion(s) of an executable program for execution by a computer processor such as the processor 802 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 802, but the entire program and/or parts thereof could alternatively be executed by a device other than the processor 802 and/or embodied in firmware or dedicated hardware. Further, although the example programs are described with reference to the flowcharts illustrated in FIGS. 1-5, many other methods of implementing the example processing apparatus 600 and the example processing apparatus 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 1-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
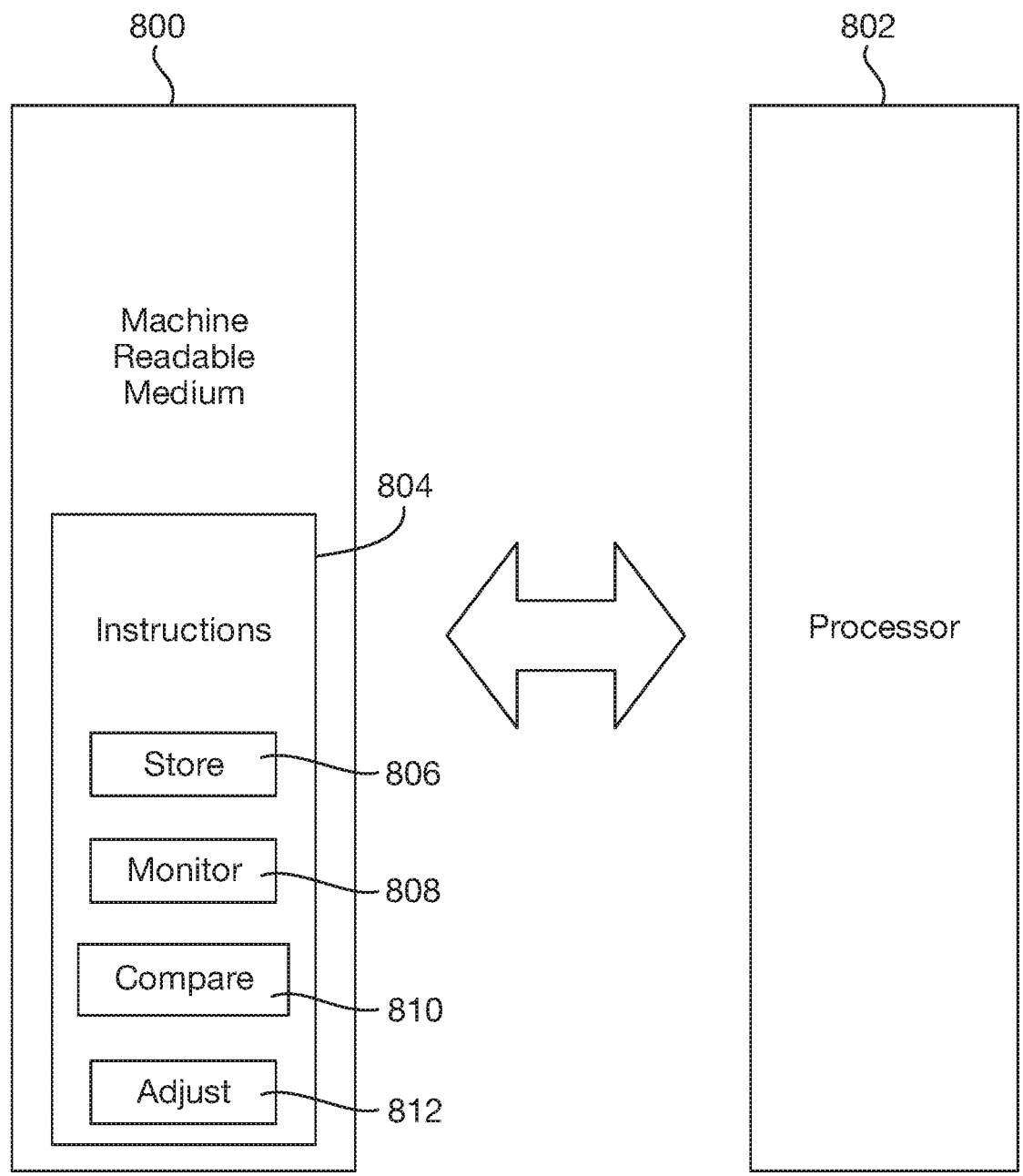
FIG. 8 is a block diagram of an example machine readable medium and an example processor.

FIG. 8 shows an example tangible (and non-transitory) machine readable medium 800 in association with a processor 802. The processor 802 of the illustrated example is hardware. For example, the processor 802 can be implemented by one or more integrated circuits, logic circuits, microprocessors, GPUs, DSPs, or controllers from any desired family or manufacturer. The hardware processor may be a semiconductor based (e.g., silicon based) device. The processor 802 of the illustrated example is in communication (e.g., via a bus) with the medium 804. The medium 804 may be implemented by a local memory of the processor 802, a main memory including a volatile memory, and/or a main memory including a non-volatile memory. The volatile memory may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory may be implemented by flash memory and/or any other desired type of memory device. Access to the main memory is controlled by a memory controller. The memory 804 can also include one or more mass storage devices for storing software and/or data. Examples of such mass storage devices include floppy disk drives, hard drive disks, compact disk drives, Blu-ray disk drives, redundant array of independent disks (RAID) systems, and digital versatile disk (DVD) drives. The machine executable instructions of FIGS. 1-5 can be stored in the memory 804 (e.g., in a mass storage device, in a volatile memory, in a non-volatile memory, and/or on a removable non-transitory computer readable storage medium such as a CD or DVD).

As disclosed above, the medium 800 includes instructions 804 which, when executed by the processor 802, cause the processor 802 to carry out one or more tasks. For example the instructions 804, when executed by the processor 802, may cause the processor 802 to carry out any one of the methods 100-500 according to the examples of FIGS. 1-5 respectively. In the example of FIG. 8, for example, the instructions 804 include instructions 806 to cause the processor 802 to store, in a database, a set of suspension profiles, wherein each suspension profile includes a stored performance parameter of a vehicle and a suspension setting. The instructions 804 include instructions 808 to cause the processor 802 to monitor a driver performance parameter of a driver driving a vehicle. The driver performance parameter characterises the behaviour of the driver of the vehicle. The instructions 804 include instructions 810 to cause the processor 802 to compare the driver performance parameter to at least one suspension profile stored in the database and determine whether the driver performance parameter corresponds to a stored performance parameter in a first suspension profile in the set of suspension profiles. The instructions 804 include instructions 812 to cause the processor 802 to automatically adjust the suspension of the vehicle according to the suspension setting of the first suspension profile.

The instructions 804 may further include instructions to cause the processor 802 to receive, from a second vehicle or central database or central server, a suspension profile and store, in a database at the first vehicle, the received suspension profile.

The instructions 804 can further include instructions to cause the processor 802 to monitor a vehicle parameter of the vehicle, compare the monitored vehicle parameter to the stored vehicle parameter, and automatically adjust the suspension profile of the vehicle if the monitored vehicle parameter is within a tolerance of the stored vehicle parameter.

Figure 9:
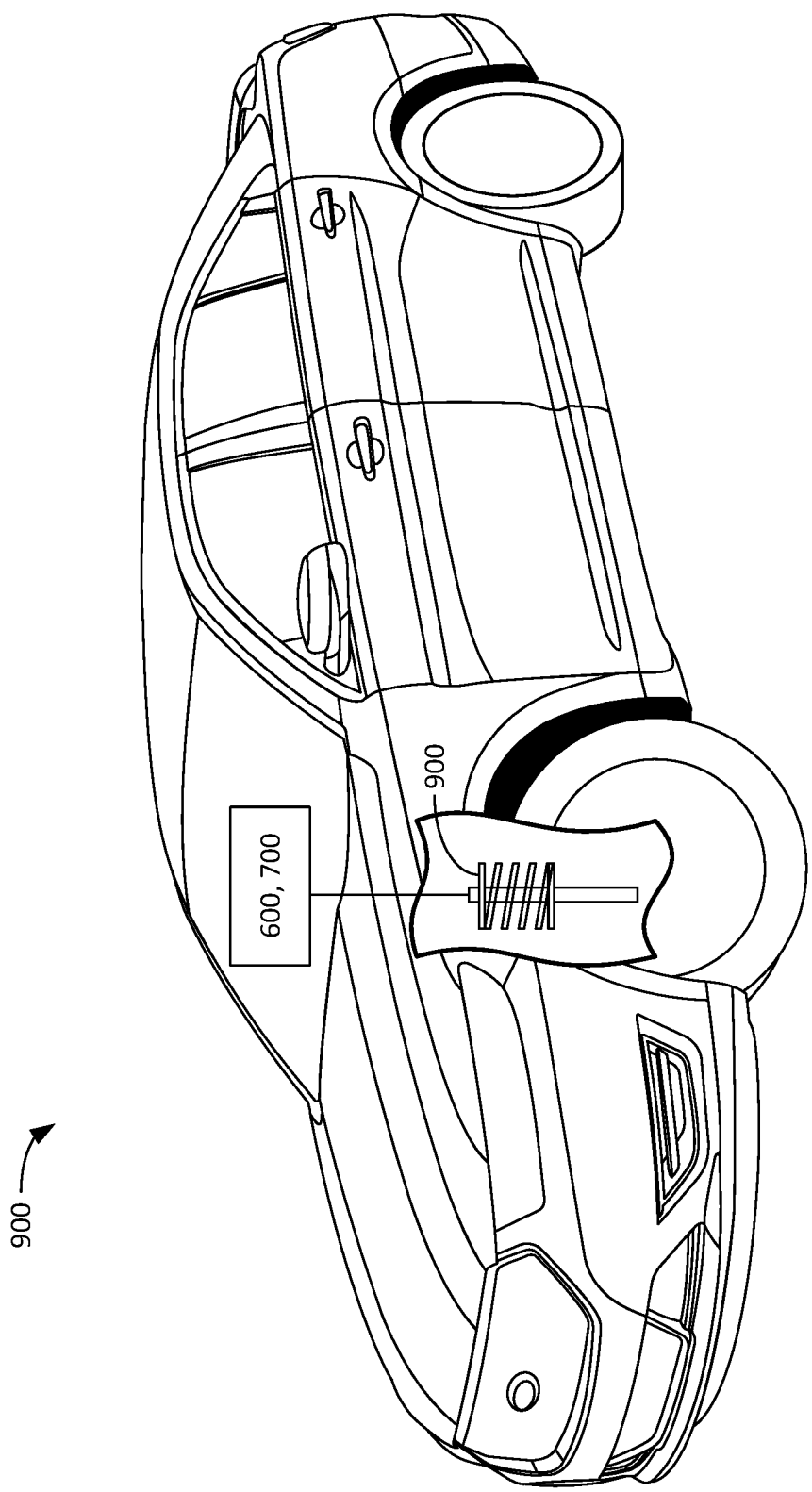
FIG. 9 illustrates an example vehicle in which the example processing apparatuses of FIGS. 6-8 may be implemented.

FIG. 9 illustrates an example vehicle 900 in which the example methods and apparatus disclosed herein can be implemented. For example, the processing apparatus 600 of FIG. 6 and/or the processing apparatus 700 of FIG. 7 may be implemented in the vehicle 900 (e.g., in an engine control unit (ECU) of the vehicle 900). The example vehicle 900 of FIG. 9 includes one or more suspension component(s) 902 (one of which is referenced in FIG. 9). In some examples, each wheel of the vehicle 900 includes a separate suspension component. In some examples, the suspension component(s) 902 is/are shock absorbers (e.g., a combined spring and damper). The suspension components(s) 900 form(s) the suspension of the vehicle 900. The suspension components(s) 902 is/are adjustable. The suspension component(s) 902 can be active or semi-active. For example, the damping parameter and/or spring parameter of the suspension component 902 can be adjusted to affect the ride of the vehicle (e.g., a stiffer ride, a softer ride, etc.). The suspension component(s) 902 can include one or more actuators to alter or change the states of the damping and/or spring parameters. The suspension component(s) 902 is/are controlled (e.g., adjusted, activated, etc.) via command signals from the controller 608, 708.

Example methods, apparatus, systems, and articles of manufacture to adjust a suspension of a vehicle are disclosed herein. Further examples and combinations thereof include the following:

Example 1 is a method including: storing, in a database, a set of suspension profiles, wherein each suspension profile includes a stored performance parameter of a vehicle and a suspension setting; monitoring a driver performance parameter of a driver driving a vehicle, the driver performance parameter characterising the behaviour of the driver of the vehicle; comparing the driver performance parameter to at least one suspension profile stored in the database; and, if the driver performance parameter corresponds to a stored performance parameter in a first suspension profile in the set of suspension profiles, automatically adjusting the suspension of the vehicle according to the suspension setting of the first suspension profile.

Example 2 includes the method of Example 1, wherein the suspension of the vehicle is automatically adjusted according to the suspension setting of the first suspension profile if the driver performance parameter is within a target range of the stored performance parameter in the first suspension profile.

Example 3 includes the method of Example 1, wherein each suspension profile includes a set of stored performance parameters and a set of suspension settings, wherein the set of stored performance parameters includes a plurality of performance parameters, and wherein the set of suspension settings includes a plurality of suspension settings.

Example 4 includes the method of Example 3, wherein monitoring a driver performance includes monitoring a plurality of driver performance parameters and, wherein comparing the driver performance parameter to at least one suspension profile includes comparing each driver performance parameter to each stored performance parameter in the set of stored performance parameters in a first suspension profile and wherein, if over a threshold number of driver performance parameters correspond to stored performance parameters in the first suspension profile, the method further includes automatically adjusting the suspension of the vehicle according to at least two of the plurality of suspension settings in the set of suspension settings.

Example 5 includes the method of Example 4, wherein the suspension of the vehicle is automatically adjusted if over a threshold number of driver performance parameters are within a target range of a corresponding stored performance parameter in the first suspension profile.

Example 6 includes the method of any of Examples 1-5, wherein the vehicle is a first vehicle, and wherein the method further includes: receiving from a second vehicle or a central server or database, a suspension profile; and storing, in a database at the first vehicle, the received suspension profile.

Example 7 includes the method of Example 6, further including: automatically receiving at least one suspension profile from the second vehicle to the first vehicle if the second vehicle is within a predetermined distance from the first vehicle.

Example 8 includes the method of any of Examples 1-7, further including a cloud device and wherein the cloud device includes the database.

Example 9 includes the method of any of Examples 1-8, wherein each suspension profile further includes a stored vehicle parameter, the method further including: monitoring a vehicle parameter of the vehicle; comparing the monitored vehicle parameter to the stored vehicle parameter; and automatically adjusting the suspension profile of the vehicle if the monitored vehicle parameter is within a tolerance of the stored vehicle parameter.

Example 10 includes the method of Example 9, wherein each suspension profile further includes a set of stored vehicle parameters, the set including a plurality of stored vehicle parameters, the method further including: monitoring a plurality of vehicle parameters of the vehicle; comparing each monitored vehicle parameter to each stored vehicle parameter in the set; and automatically adjusting the suspension profile of the vehicle if over a threshold number of monitored vehicle parameters are within a tolerance of corresponding stored vehicle parameters.

Example 11 includes the method of Examples 9 or 10, wherein the vehicle parameter includes at least one of: the location of the vehicle, the speed of the vehicle, how many passengers are on board the vehicle, the weather conditions in the vicinity of the vehicle, the vehicle type, or the driver's mood.

Example 12 includes the method of any of Examples 9-11, wherein the driver performance parameter and/or the stored performance parameters include at least one of: brake pedal pressure, speed, engine speed, the steering wheel angle, rate of change of input (e.g. force or amplitude) to the accelerator pedal, rate of change of position (e.g. events per second) of the accelerator pedal, rate of change of steering wheel angle, or the gear of the vehicle.

Example 13 is a processing apparatus including: a database configured to store a set of suspension profiles, wherein each suspension profile includes a stored performance parameter of a vehicle and a suspension setting; a sensor configured to monitor a driver performance parameter of a driver driving a vehicle, the driver performance parameter characterising the behaviour of the driver of the vehicle; a processor configured to compare the driver performance parameter to at least one suspension profile stored in the database; and a controller configured to automatically adjust the suspension of the vehicle according to the suspension setting of the first suspension profile if the driver performance parameter corresponds to a stored performance parameter in a first suspension profile in the set of suspension profiles.

Example 14 includes the processing apparatus of Example 13, wherein the controller is configured to automatically adjust the suspension of the vehicle if the driver performance parameter is within a target range of the stored performance parameter in the first suspension profile.

Example 15 includes the processing apparatus of Examples 13 or 14, wherein each suspension profile includes a set of stored performance parameters and a set of suspension settings, wherein the set of stored performance parameters includes a plurality of performance parameters, and wherein the set of suspension settings includes a plurality of suspension settings.

Example 16 includes the processing apparatus of Example 15, wherein the sensor is configured to monitor a plurality of driver performance parameters and the processor is configured compare each driver performance parameter to each stored performance parameter in the set of stored performance parameters in a first suspension profile and wherein the controller is configured to automatically adjust the suspension of the vehicle according to at least two of the plurality of suspension settings in the set of suspension settings if over a threshold number of driver performance parameters correspond to stored performance parameters in the first suspension profile.

Example 17 includes the processing apparatus of Example 16, wherein the controller is configured to automatically adjust the suspension of the vehicle if over a threshold number of driver performance parameters are within a target range of a corresponding stored performance parameter in the first suspension profile.

Example 18 includes the processing apparatus of any of Examples 13-17, wherein the vehicle is a first vehicle, and wherein the processing apparatus further includes: a receiver to receive a suspension profile from a second vehicle or central database or central server; and wherein the database is to store the received suspension profile.

Example 19 includes the processing apparatus of any of Examples 13-18, further including a cloud device and wherein the cloud device includes the database.

Example 20 includes the processing apparatus of any of Examples 13-19, wherein each suspension profile further includes a stored vehicle parameter, wherein the processing apparatus further includes a further sensor to monitor a vehicle parameter of the vehicle; wherein the processor is to compare the monitored vehicle parameter to the stored vehicle parameter; and wherein the controller is to automatically adjust the suspension profile of the vehicle if the monitored vehicle parameter is within a tolerance of the stored vehicle parameter.

Example 21 includes the processing apparatus of Example 20, wherein each suspension profile further includes a set of stored vehicle parameters, the set includes a plurality of stored vehicle parameters; wherein the further sensor is to monitor a plurality of vehicle parameters of the vehicle; wherein the processor is to compare each monitored vehicle parameter to each stored vehicle parameter in the set; and wherein the controller is to automatically adjust the suspension profile of the vehicle if over a threshold number of monitored vehicle parameters are within a tolerance of corresponding stored vehicle parameters.

Example 22 includes the processing apparatus of Examples 20 or 21, wherein the vehicle parameter includes at least one of: the location of the vehicle, the speed of the vehicle, how many passengers are on board the vehicle, the weather conditions in the vicinity of the vehicle, the vehicle type, or the driver's mood.

Example 23 includes the processing apparatus of any of Examples 13-22, wherein the driver performance parameter and/or the stored performance parameters include at least one of: brake pedal pressure, speed, engine speed, the steering wheel angle, rate of change of input (e.g. force or amplitude) to the accelerator pedal, rate of change of position (e.g. events per second) of the accelerator pedal, rate of change of steering wheel angle, or the gear of the vehicle.

Example 24 is a non-transitory machine readable storage medium including instructions that, when executed by a processor, cause the processor to: store, in a database, a set of suspension profiles, wherein each suspension profile includes a stored performance parameter of a vehicle and a suspension setting; monitor a driver performance parameter of a driver driving a vehicle, the driver performance parameter characterising the behaviour of the driver of the vehicle; compare the driver performance parameter to at least one suspension profile stored in the database; and, if the driver performance parameter corresponds to a stored performance parameter in a first suspension profile in the set of suspension profiles, automatically adjust the suspension of the vehicle according to the suspension setting of the first suspension profile.

Example 25 includes the non-transitory machine readable medium of Example 24, wherein the instructions, when executed, cause the processor to: automatically adjust the suspension of the vehicle according to the suspension setting of the first suspension profile if the driver performance parameter is within a target range of the stored performance parameter in the first suspension profile.

Example 26 includes the non-transitory machine readable medium of Example 24, wherein each suspension profile includes a set of stored performance parameters and a set of suspension settings, wherein the set of stored performance parameters includes a plurality of performance parameters, and wherein the set of suspension settings includes a plurality of suspension settings.

Example 27 includes the non-transitory machine readable medium of Example 26, wherein the instructions, when executed, cause the processor to: monitor a plurality of driver performance parameters; compare each driver performance parameter to each stored performance parameter in the set of stored performance parameters in a first suspension profile; and automatically adjust the suspension of the vehicle according to at least two of the plurality of suspension settings in the set of suspension settings if over a threshold number of driver performance parameters correspond to stored performance parameters in the first suspension profile.

Example 28 includes the non-transitory machine readable medium of Example 27, wherein the instructions, when executed, cause the processor to: automatically adjust the suspension of the vehicle if over a threshold number of driver performance parameters are within a target range of a corresponding stored performance parameter in the first suspension profile.

Example 29 includes the non-transitory machine readable medium of any of Examples 24-28, wherein the vehicle is a first vehicle, and wherein the instructions, when executed, cause the processor to: receive, from a second vehicle, central database, or central server, a suspension profile; and store, in a database at the first vehicle, the received suspension profile.

Example 30 includes the non-transitory machine readable medium of any of Examples 24-29, wherein each suspension profile further includes a stored vehicle parameter, and wherein the instructions, when executed, cause the processor to: monitor a vehicle parameter of the vehicle; compare the monitored vehicle parameter to the stored vehicle parameter; and automatically adjust the suspension profile of the vehicle if the monitored vehicle parameter is within a tolerance of the stored vehicle parameter.

Example 31 includes the non-transitory machine readable medium of Example 30, wherein each suspension profile further includes a set of stored vehicle parameters, the set including a plurality of stored vehicle parameters, and wherein the instructions, when executed, cause the processor to: monitor a plurality of vehicle parameters of the vehicle; compare each monitored vehicle parameter to each stored vehicle parameter in the set; and automatically adjust the suspension profile of the vehicle if over a threshold number of monitored vehicle parameters are within a tolerance of corresponding stored vehicle parameters.

Example 32 includes non-transitory machine readable medium of Example 30 or 31, wherein the vehicle parameter includes at least one of: the location of the vehicle, the speed of the vehicle, how many passengers are on board the vehicle, the weather conditions in the vicinity of the vehicle, the vehicle type, or the driver's mood.

Example 33 includes the non-transitory machine readable medium of any of Examples 24-32, wherein the driver performance parameter and/or the stored performance parameters include at least one of: brake pedal pressure, speed, engine speed, the steering wheel angle, rate of change of input (e.g. force or amplitude) to the accelerator pedal, rate of change of position (e.g. events per second) of the accelerator pedal, rate of change of steering wheel angle, or the gear of the vehicle. Although certain example methods, systems, apparatus and articles of manufacture have been disclosed herein, the scope of coverage of this patent is not limited thereto. On the contrary, this patent covers all methods, systems, apparatus and articles of manufacture fairly falling within the scope of the claims of this patent.

Example 34 is an apparatus including a memory storing a plurality of suspension profiles, each of the suspension profiles including a stored performance parameter of a vehicle and a suspension setting; a sensor to detect a driver performance parameter of a driver driving the vehicle, the driver performance parameter representing a behaviour of the driver of the vehicle; a processor to compare the driver performance parameter to at least one of the plurality of suspension profiles stored in the memory; and a controller to adjust a suspension of the vehicle according to a first suspension setting of a first suspension profile of the plurality of suspension profiles if the driver performance parameter corresponds to a first stored performance parameter of the first suspension profile.

Example 35 includes the apparatus of Example 34, wherein the controller is to adjust the suspension of the vehicle according to the first suspension setting of the first suspension profile if the driver performance parameter is within a target range of the first stored performance parameter.

Example 36 includes the apparatus of Examples 34 or 35, wherein the vehicle is a first vehicle, further including a receiver to receive a suspension profile from a second vehicle, and wherein the memory is to store the suspension profile from the second vehicle with the plurality of suspension profiles.

Example 37 includes the apparatus of any of Examples 34-36, wherein the sensor is a first sensor, and wherein each of the suspension profiles includes a stored vehicle parameter, further including a second sensor to detect a vehicle parameter of the vehicle, wherein the processor is to compare the detected vehicle parameter to the stored vehicle parameters, and wherein the controller is to adjust the suspension of the vehicle according to the first suspension setting if the detected vehicle parameter is within a tolerance of a first stored vehicle parameter of the first suspension profile.

Example 38 includes the apparatus of Example 37, wherein: each of the suspension profiles includes a plurality of stored vehicle parameters; the second sensor is to detect a plurality of vehicle parameters of the vehicle; the processor is to compare the detected vehicle parameters to the stored vehicle parameters of the suspension profiles; and the controller is to adjust the suspension of the vehicle according to the first suspension setting if a number of the detected vehicle parameters within a tolerance of the stored vehicle parameters of the first suspension profile satisfies a threshold.

Example 39 includes the apparatus of Examples 37 or 38, wherein the vehicle parameter includes at least one of a location of the vehicle, a speed of the vehicle, a number of passengers in the vehicle, a weather condition in a vicinity of the vehicle, a vehicle type, or a mood of the driver.

Example 40 includes the apparatus of any of Examples 34-39, wherein the driver performance parameter and the stored performance parameters include at least one of a brake pedal pressure of the vehicle, a speed of the vehicle, an engine speed of the vehicle, a steering wheel angle of the vehicle, a rate of change of the steering wheel angle of the vehicle, a rate of change of input to an accelerator pedal of the vehicle, a rate of change of position of the accelerator pedal of the vehicle, or a gear of the vehicle.

Example 41 is a non-transitory machine readable medium comprising instructions that, when executed, cause at least one machine to at least: detect a driver performance parameter of a driver driving a vehicle, the driver performance parameter representing a behaviour of the driver of the vehicle; compare the driver performance parameter to at least one suspension profile of a plurality of suspension profiles stored in a database, each of the suspension profiles including a stored performance parameter of the vehicle and a suspension setting; and if the driver performance parameter corresponds to a first stored performance parameter of a first suspension profile of the plurality of suspension profiles, adjust a suspension of the vehicle according to a first suspension setting of the first suspension profile.

Example 42 includes the non-transitory machine readable medium of Example 41, wherein each of the suspension profiles includes a plurality of stored performance parameters and a plurality of suspension settings.

Example 43 includes the non-transitory machine readable medium of Example 42, wherein the instructions, when executed, cause the at least one machine to: detect a plurality of driver performance parameters; compare the driver performance parameters to the stored performance parameter of the first suspension profile; and adjust the suspension of the vehicle according to at least two of the suspension settings of the first suspension profile if a number of the driver performance parameters corresponding to the stored performance parameters of the first suspension profile satisfies a threshold.

Example 44 includes the non-transitory machine readable medium of Example 43, wherein the instructions, when executed, cause the at least one machine to: adjust the suspension of the vehicle according to the at least two of the suspension settings of the first suspension profile if a number of the driver performance parameters within a target range of the stored performance parameters of the first suspension profile satisfies the threshold.

Example 45 includes the non-transitory machine readable medium of any of Example 41-44, wherein the database is stored in a cloud device.

Example 46 includes the non-transitory machine readable medium of any of Examples 41-45, wherein the vehicle is a first vehicle, wherein the database is in the vehicle, and wherein the instructions, when executed, cause the at least one machine to: receive a suspension profile from at least one of a second vehicle, a central database, or central server; and store the received suspension profile in the database.

Example 47 includes the non-transitory machine readable medium of any of Examples 41-46, wherein each of the suspension profiles includes a stored vehicle parameter, and wherein the instructions, when executed, cause the at least one machine to: detect a vehicle parameter of the vehicle; compare the detect vehicle parameters to the stored vehicle parameters of the suspension profiles; and adjust the suspension of the vehicle according to the first suspension setting if a number of the detected vehicle parameters within a tolerance of the stored vehicle parameters of the first suspension profile satisfies a threshold.

Example 48 includes the non-transitory machine readable medium of Example 47, wherein the vehicle parameter includes at least one of a location of the vehicle, a speed of the vehicle, a number of passengers in the vehicle, a weather condition in a vicinity of the vehicle, a vehicle type, or a mood of the driver.

Example 49 is a method including detecting a driver performance parameter of a driver driving a vehicle, the driver performance parameter representing the behaviour of the driver of the vehicle; comparing the driver performance parameter to at least one suspension profile of a plurality of suspension profiles stored in a database, each of the suspension profiles including a stored performance parameter of the vehicle and a suspension setting; and if the driver performance parameter corresponds to a first stored performance parameter of a first suspension profile of the plurality of suspension profiles, adjusting a suspension of the vehicle according to a first suspension setting of the first suspension profile.

Example 50 includes the method of Example 49, wherein the vehicle is a first vehicle, and wherein the database is in the vehicle, further including: receiving a suspension profile from a second vehicle; and storing the received suspension profile in the database.

Example 51 includes the method of Example 50, further including, prior to receiving the suspension profile from the second vehicle, determining if there are any vehicles within a predetermined distance of the vehicle.

Example 52 includes the method of Example 51, further including receiving the suspension profile from the second vehicle if the second vehicle is within a predetermined distance from the first vehicle.

Example 53 includes the method of any of Examples 49-52, wherein the driver performance parameter and the stored performance parameters include at least one of a brake pedal pressure of the vehicle, a speed of the vehicle, an engine speed of the vehicle, a steering wheel angle of the vehicle, a rate of change of the steering wheel angle of the vehicle, a rate of change of input to an accelerator pedal of the vehicle, a rate of change of position of the accelerator pedal of the vehicle, or a gear of the vehicle.

The following claims are hereby incorporated into this Detailed Description by this reference, with each claim standing on its own as a separate embodiment of the present disclosure.

What is claimed is:

1. An apparatus comprising:
   a memory storing a plurality of suspension profiles, each of the suspension profiles including a stored performance parameter of a vehicle and a suspension setting;
   a sensor to detect a driver performance parameter of a driver driving the vehicle, the driver performance parameter representing a behaviour of the driver of the vehicle; and
   processor circuitry to:
      compare the driver performance parameter to at least one of the plurality of suspension profiles stored in the memory;
      adjust a suspension of the vehicle according to a first suspension setting of a first suspension profile of the plurality of suspension profiles when the driver performance parameter corresponds to a first stored performance parameter of the first suspension profile;
      determine whether the first suspension setting has been overridden; and
      in response to determining the first suspension setting has been overridden, at least one of update the first suspension profile or generate a second suspension profile.

2. The apparatus of claim 1, wherein the processor circuitry is to adjust the suspension of the vehicle according to the first suspension setting of the first suspension profile when the driver performance parameter is within a target range of the first stored performance parameter.

3. The apparatus of claim 1, wherein the vehicle is a first vehicle, further including a receiver to receive a suspension profile from a second vehicle, and wherein the memory is to store the suspension profile from the second vehicle with the plurality of suspension profiles.

4. The apparatus of claim 1, wherein the sensor is a first sensor, and wherein each of the suspension profiles includes a stored vehicle parameter, further including a second sensor to detect a vehicle parameter of the vehicle, wherein the processor circuitry is to compare the detected vehicle parameter to the stored vehicle parameters, and wherein the processor circuitry is to adjust the suspension of the vehicle according to the first suspension setting when the detected vehicle parameter is within a tolerance of a first stored vehicle parameter of the first suspension profile.

5. The apparatus of claim 4, wherein:
   each of the suspension profiles includes a plurality of stored vehicle parameters;
   the second sensor is to detect a plurality of vehicle parameters of the vehicle;
   the processor circuitry is to compare the detected vehicle parameters to the stored vehicle parameters of the suspension profiles; and
   the processor circuitry is to adjust the suspension of the vehicle according to the first suspension setting when a number of the detected vehicle parameters within a tolerance of the stored vehicle parameters of the first suspension profile satisfies a threshold.

6. The apparatus of claim 4, wherein the vehicle parameter includes at least one of a location of the vehicle, a speed of the vehicle, a number of passengers in the vehicle, a weather condition in a vicinity of the vehicle, a vehicle type, or a mood of the driver.

7. The apparatus of claim 1, wherein the driver performance parameter and the stored performance parameters include at least one of a brake pedal pressure of the vehicle, a speed of the vehicle, an engine speed of the vehicle, a steering wheel angle of the vehicle, a rate of change of the steering wheel angle of the vehicle, a rate of change of input to an accelerator pedal of the vehicle, a rate of change of position of the accelerator pedal of the vehicle, or a gear of the vehicle.

8. A non-transitory machine readable medium comprising instructions that, when executed, cause at least one machine to at least:
   detect a driver performance parameter of a driver driving a vehicle, the driver performance parameter representing a behaviour of the driver of the vehicle;
   compare the driver performance parameter to at least one suspension profile of a plurality of suspension profiles stored in a database, each of the suspension profiles including a stored performance parameter of the vehicle and a suspension setting;
   when the driver performance parameter corresponds to a first stored performance parameter of a first suspension profile of the plurality of suspension profiles, adjust a suspension of the vehicle according to a first suspension setting of the first suspension profile;
   detect a change in the suspension from the first suspension setting to a second suspension setting; and
   in response to detecting the change in the suspension, at least one of update the first suspension profile or generate a second suspension profile to include the second suspension setting.

9. The non-transitory machine readable medium of claim 8, wherein each of the suspension profiles includes a plurality of stored performance parameters and a plurality of suspension settings.

10. The non-transitory machine readable medium of claim 9, wherein the instructions, when executed, cause the at least one machine to:
    detect a plurality of driver performance parameters;
    compare the driver performance parameters to the stored performance parameter of the first suspension profile; and
    adjust the suspension of the vehicle according to at least two of the suspension settings of the first suspension profile when a number of the driver performance parameters corresponding to the stored performance parameters of the first suspension profile satisfies a threshold.

11. The non-transitory machine readable medium of claim 10, wherein the instructions, when executed, cause the at least one machine to:
    adjust the suspension of the vehicle according to the at least two of the suspension settings of the first suspension profile when a number of the driver performance parameters within a target range of the stored performance parameters of the first suspension profile satisfies the threshold.

12. The non-transitory machine readable medium of claim 8, wherein the database is stored in a cloud device.

13. The non-transitory machine readable medium of claim 8, wherein the vehicle is a first vehicle, wherein the database is in the vehicle, and wherein the instructions, when executed, cause the at least one machine to:
    receive a suspension profile from at least one of a second vehicle, a central database, or central server; and
    store the received suspension profile in the database.

14. The non-transitory machine readable medium of claim 8, wherein each of the suspension profiles includes a stored vehicle parameter, and wherein the instructions, when executed, cause the at least one machine to:
    detect a vehicle parameter of the vehicle;
    compare the detect vehicle parameters to the stored vehicle parameters of the suspension profiles; and
    adjust the suspension of the vehicle according to the first suspension setting when a number of the detected vehicle parameters within a tolerance of the stored vehicle parameters of the first suspension profile satisfies a threshold.

15. The non-transitory machine readable medium of claim 14, wherein the vehicle parameter includes at least one of a location of the vehicle, a speed of the vehicle, a number of passengers in the vehicle, a weather condition in a vicinity of the vehicle, a vehicle type, or a mood of the driver.

16. A method comprising:
    detecting driver performance parameters of a driver driving a first vehicle, the driver performance parameters representing behaviours of the driver of the first vehicle;
    comparing the driver performance parameters to a first suspension profile of a plurality of suspension profiles stored in a database in the first vehicle, the first suspension profile including stored performance parameters of the first vehicle and suspension settings;
    determining whether a number of the driver performance parameters correspond to at least one of the stored performance parameters of the first suspension profile;
    in response to determining that the number of the driver performance parameters corresponding to at least one of the stored performance parameters satisfies a threshold, adjusting a suspension of the first vehicle based on the suspension settings of the first suspension profile;
    receiving a second suspension profile from a second vehicle; and
    storing the second suspension profile in the database.

17. The method of claim 16, further including, prior to receiving the second suspension profile from the second vehicle, determining when there are any vehicles within a predetermined distance of the first vehicle.

18. The method of claim 17, further including receiving the second suspension profile from the second vehicle when the second vehicle is within a predetermined distance from the first vehicle.

19. The method of claim 16, wherein the driver performance parameters and the stored performance parameters include at least one of a brake pedal pressure of the first vehicle, a speed of the first vehicle, an engine speed of the first vehicle, a steering wheel angle of the first vehicle, a rate of change of the steering wheel angle of the first vehicle, a rate of change of input to an accelerator pedal of the first vehicle, a rate of change of position of the accelerator pedal of the first vehicle, or a gear of the first vehicle.

* * * * *